(12) United States Patent
Shiraishi et al.

(10) Patent No.: US 11,124,414 B2
(45) Date of Patent: Sep. 21, 2021

(54) METHOD FOR PRODUCING HYDROGEN PEROXIDE, KIT FOR HYDROGEN PEROXIDE PRODUCTION, ORGANIC POLYMER PHOTOCATALYST USED IN SAID METHOD AND KIT, AND METHOD FOR PRODUCING SAID ORGANIC POLYMER PHOTOCATALYST

(71) Applicant: OSAKA UNIVERSITY, Suita (JP)

(72) Inventors: Yasuhiro Shiraishi, Suita (JP); Takayuki Hirai, Suita (JP)

(73) Assignee: OSAKA UNIVERSITY, Suita (JP)

( * ) Notice: Subject to any disclaimer, the term of this patent is extended or adjusted under 35 U.S.C. 154(b) by 0 days.

(21) Appl. No.: 16/342,749

(22) PCT Filed: Oct. 17, 2017

(86) PCT No.: PCT/JP2017/037488
§ 371 (c)(1),
(2) Date: Apr. 17, 2019

(87) PCT Pub. No.: WO2018/074456
PCT Pub. Date: Apr. 26, 2018

(65) Prior Publication Data
US 2020/0048089 A1     Feb. 13, 2020

(30) Foreign Application Priority Data
Oct. 20, 2016    (JP) .................. JP2016-206374

(51) Int. Cl.
*C01B 15/027*    (2006.01)
*B01J 31/06*    (2006.01)
*C08G 8/22*    (2006.01)

(52) U.S. Cl.
CPC ............ *C01B 15/027* (2013.01); *B01J 31/06* (2013.01); *C08G 8/22* (2013.01)

(58) Field of Classification Search
CPC ........... C01B 15/027; B01J 31/06; C08G 8/22
(Continued)

(56) References Cited

U.S. PATENT DOCUMENTS

2013/0220822 A1    8/2013    Winther-Jensen et al.
2014/0141346 A1    5/2014    Fukuzumi et al.

FOREIGN PATENT DOCUMENTS

CN      103709346 A    4/2014
CN      103871756 A    6/2014
(Continued)

OTHER PUBLICATIONS

International Search Report dated Jan. 16, 2018, issued in counterpart application No. PCT/JP2017/037488 (2 pages).
(Continued)

*Primary Examiner* — Melissa S Swain
(74) *Attorney, Agent, or Firm* — Westerman, Hattori, Daniels & Adrian, LLP (57) ABSTRACT

The present invention provides a hydrogen peroxide production method and a hydrogen peroxide production kit that are capable of producing hydrogen peroxide more efficiently and at lower costs than conventional methods. Specifically, the present invention provides a hydrogen peroxide production method comprising: (1) a hydrogen peroxide generation step of generating hydrogen peroxide by irradiating a reaction system containing water, an organic polymer photocatalyst, and $O_2$ with light, wherein (2) the organic polymer photocatalyst comprises an organic polymer having a structure such that a monocyclic or polycyclic aromatic compound and/or a monocyclic or polycyclic heteroaromatic compound is/are linked by a bridging group, and (3) the organic polymer has a band structure such that a conduction band (CB) has a potential lower than the potential of two-electron reduction of $O_2$, and a valance band (VB) has
(Continued)

a potential higher than the potential of four-electron oxidation of water.

7 Claims, 3 Drawing Sheets

(58) Field of Classification Search
USPC .......................................................... 423/584
See application file for complete search history.

(56) References Cited

FOREIGN PATENT DOCUMENTS

| | | |
|---|---|---|
| JP | 2013-203783 A | 10/2013 |
| JP | 2015-100755 A | 6/2015 |
| JP | 2015-218105 A | 12/2015 |
| WO | 2013/002188 A1 | 1/2013 |

OTHER PUBLICATIONS

Zhang et al., "Macro-mesoporous resorcinol-formaldehyde polymer resins as amorphous metal-free visible light photocatalysts", Journal of Materials Chemistry A, 2015, vol. 3, pp. 15413-15419, cited in ISR (7 pages).

Liu et al., "Extension of the Stöber Method to the Preparation of Monodisperse Resorcinol-Formaldehyde Resin Polymer and Carbon Spheres", Angewandte Chemie International Edition, 2011, 50, pp. 5947-5951, cited in ISR (5 pages).

Mori et al., "Solar-to-hydrogen peroxide conversion on resorcinol-formaldehyde resin photocatalysts", Presentation reprints of the 97th Annual Meeting 2017 of The Chemical Society of Japan, 2017, 1A8-26, entire text, cited in ISR (3 pages).

Zheng et al., "Enhancing the charge separation and migration efficiency of $Bi_2WO_6$ by hybridizing the P3HT conducting polymer", Royal Society of Chemistry Advances, 2015, vol. 5, pp. 99658-99663, cited in the International Preliminary Report on Patentability (6 pages).

Shiraishi et al., "Sunlight-Driven Hydrogen Peroxide Production from Water and Molecular Oxygen by Metal-Free Photocatalysts", Angewandte Chemie International Edition, 2014, vol. 53, pp. 13454-13459, cited in the International Preliminary Report on Patentability (6 pages).

Kaynan et al., "Sustainable photocatalytic production of hydrogen peroxide from water and molecular oxygen", Journal of Materials Chemistry A, 2014, vol. 2, pp. 13822-13826, Cited in Specification (5 pages).

Moon et al., "Solar production of $H_2O_2$ on reduced graphene oxide-$TiO_2$ hybrid photocatalysts consisting of earth-abundant elements only", Energy & Environmental Science, 2014, vol. 7, pp. 4023-4028, Cited in Specification (6 pages).

Kim et al., "Harnessing low energy photons (635 nm) for the production of $H_2O_2$ using upconversion nanohybrid photocatalysts", Energy & Environmental Science, 2016, vol. 9, pp. 1063-1073, Cited in Specification (3 pages).

Reijnders et al., "Chapter 2. Energy Balance: Cumulative Fossil Fuel Demand and Solar Energy Conversion Efficiency of Transport Biofuels", Biofuels for Road Transport: A Seed to Wheel Perspective, Springer: New York, 2009, pp. 49-74, Cited in Specification (6 pages).

Abdiryim et al., "A facile solid-state heating method for preparation of poly(3,4-ethelenedioxythiophene)/ZnO nanocomposite and photocatalytic activity", Nanoscale Research Letters, 2014,9:89, Cited in Specification (8 pages).

Wang et al., "Scalable water splitting on particulate photocatalyst sheets with a solar-to-hydrogen energy conversion efficiency exceeding 1%", Nature Materials, 2016, vol. 15, pp. 611-617, Cited in Specification (7 pages).

Fourth Edition, Denki Kagaku Binran (Handbook of Electrochemistry), Jan. 25, 1985, p. 116, line 15 of left column to end line of right column, and diagram 4.4 of p. 117, with Partial English Translation; Cited in JP Office Action dated Jan. 28, 2020. (12 pages).

Office Action dated Jan. 28, 2020, issued in counterpart JP Application No. 2018-546348, with English Translation. (14 pages).

METHOD FOR PRODUCING HYDROGEN PEROXIDE, KIT FOR HYDROGEN PEROXIDE PRODUCTION, ORGANIC POLYMER PHOTOCATALYST USED IN SAID METHOD AND KIT, AND METHOD FOR PRODUCING SAID ORGANIC POLYMER PHOTOCATALYST

TECHNICAL FIELD

The present invention relates to a hydrogen peroxide production method, a hydrogen peroxide production kit, an organic polymer photocatalyst for use in the method and the kit, and a method for producing the organic polymer photocatalyst.

BACKGROUND ART

Creation of a hydrogen energy society is currently an urgent issue, but storing and delivering dihydrogen ($H_2$), which is a gas, is not easy. Accordingly, use of an energy carrier suitable for storing and delivering $H_2$ is considered important.

Organic hydride or ammonia is currently a strong candidate for being an energy career suitable for storing and delivering $H_2$. Specifically, there is a scenario in which electricity is generated using a fuel cell after multiple steps of producing $H_2$ using sunlight, converting $H_2$ to an energy carrier, storing and delivering the energy carrier, and then extracting $H_2$ from the energy carrier. However, since organic hydride and ammonia are not energy carriers that can be converted directly into electricity, the step of extracting $H_2$ is required before generating electricity using a fuel cell.

If an energy carrier that can be converted directly into electricity can be synthesized with sunlight, drastic energy savings in an electric generation process using a fuel cell can be ensured. As such an energy career, hydrogen peroxide has been drawing attention.

Hydrogen peroxide is more easily stored and delivered than $H_2$ because it is a fluid at ordinary temperature and pressure. Further, since hydrogen peroxide acts as both an oxidizing agent and a reducing agent, it is possible to generate electricity by using hydrogen peroxide alone as a starting material. Electricity generation using hydrogen peroxide alone has various advantages in that electricity can be generated under conditions of no air (e.g., under vacuum) and using no carbon, electricity can be generated in a single-compartment cell without the need for an ion exchange film, and the output voltage is equivalent to that of a $H_2/O_2$ fuel cell. Specifically, hydrogen peroxide is highly useful as compared to organic hydride and ammonia because it is an energy carrier that can be converted directly into electricity without the need for extracting $H_2$.

Additionally, hydrogen peroxide is a clean oxidizing agent that discharges water alone, and is indispensable for pulp bleaching in the paper industry. Hydrogen peroxide is also used as a disinfectant and an organic synthesis reagent (oxidizing agent), and the domestic annual production of hydrogen peroxide is as extremely large as 200,000 t.

Hydrogen peroxide has been industrially synthesized by an anthraquinone method, i.e., by hydrogenation and oxidization of anthraquinone. However, such a method requires multiple steps to obtain hydrogen peroxide, and thus is inefficient and increases the price. On the other hand, much research has been conducted on methods for directly synthesizing hydrogen peroxide from $H_2$ and dioxygen ($O_2$); however, a mixed gas of $H_2$ and $O_2$ may cause a risk of explosion, and acid or halogen may be problematically mixed into the products. Moreover, since this method uses $H_2$, producing $H_2$ by other processes is required and Pd must be used as a catalyst.

Accordingly, attention has been drawn to the development of a method for synthesizing pure hydrogen peroxide from a starting material that is highly safe and abundantly present on the earth, using a photocatalyst. Patent Literature 1 (PTL 1), for example, discloses a method for producing hydrogen peroxide, comprising a hydrogen peroxide generation step of generating hydrogen peroxide by irradiating a reaction system containing water, a water oxidation catalyst, a specific transition metal complex (photocatalyst), and $O_2$ with light. In this hydrogen peroxide production method, hydrogen peroxide is produced from water by using four-electron oxidization of water and two-electron reduction of $O_2$, and this method is advantageous in obtaining hydrogen peroxide by two-electron reduction of $O_2$ whose selectivity is generally very small. However, there is still room for further improvement because the method requires expensive metal catalysts (Ir, Ru, etc.) as photocatalysts, needs to use a large amount of Sc salts for selective two-electron reduction of $O_2$, and keeps the maximum solar-to-chemical conversion efficiency (SCC efficiency) at 0.25%.

In addition to the above, various other documents, including Non-patent Literature (NPL) 1 to 3, have reported production of hydrogen peroxide using a photocatalyst; however, there is room for further improvement because the methods require a metal oxide catalyst, the concentration of the resulting hydrogen peroxide is as low as 0.1 mM or less, and each solar-to-chemical conversion efficiency (SCC efficiency) is assumed to be 0.01% or less.

CITATION LIST

Patent Literature

PTL 1: Pamphlet of WO2013/002188

Non-Patent Literature

NPL 1: KAYNAN, N.; BERKE, B. A.; HAZUT, O.; YERUSHALMI, R. J. MATER. CHEM. A 2014, 2, 13822-13826.
NPL 2: MOON, G.-H.; KIM, W.; BOKARE, A. D.; SUNG, N.-E.; ENERGY ENVIRON. SCI. 2014, 7, 4023-4028.
NPL 3: KIM, H.-I.; KWON, O. S.; KIM, S.; CHOI, W.; KIM, J.-H. ENERGY ENVIRON. SCI. 2016, 9, 1063-1073.

SUMMARY OF INVENTION

Technical Problem

An object of the present invention is to provide a hydrogen peroxide production method and a hydrogen peroxide production kit that are capable of producing hydrogen peroxide more efficiently and at lower costs than conventional methods. Another object of the present invention is to provide an organic polymer photocatalyst used for the above method and kit, and a method for producing the organic polymer photocatalyst.

Solution to Problem

The present inventors conducted extensive research to achieve the above objects. As a result, they found that the above objects can be achieved by using an organic polymer photocatalyst having a specific band structure and a structure such that a monocyclic or polycyclic aromatic compound and/or a monocyclic or polycyclic heteroaromatic compound is/are linked by a bridging group. The present invention was thus accomplished.

Specifically, the present invention relates to the following method for producing hydrogen peroxide, kit for producing hydrogen peroxide, organic polymer photocatalyst for use in the method and the kit, and a method for producing the organic polymer photocatalyst.

1. A hydrogen peroxide production method comprising:
(1) a hydrogen peroxide generation step of generating hydrogen peroxide by irradiating a reaction system containing water, an organic polymer photocatalyst, and $O_2$ with light, wherein
(2) the organic polymer photocatalyst comprises an organic polymer having a structure such that a monocyclic or polycyclic aromatic compound and/or a monocyclic or polycyclic heteroaromatic compound is/are linked by a bridging group, and
(3) the organic polymer has a band structure such that a conduction band (CB) has a potential lower than the potential of two-electron reduction of $O_2$, and a valance band (VB) has a potential higher than the potential of four-electron oxidation of water.
2. The hydrogen peroxide production method according to Item 1, wherein the bridging group is at least one member selected from the group consisting of methylene, ethylene, and ether linkages.
3. The hydrogen peroxide production method according to Item 1 or 2, wherein the aromatic compound and/or the heteroaromatic compound has/have at least one functional group selected from the group consisting of hydroxy, chlorine, fluorine, aldehyde, and amino in a molecule.
4. The hydrogen peroxide production method according to Item 1 or 2, wherein the aromatic compound is at least one phenol or phenol derivative selected from the group consisting of resorcinol, m-aminophenol, m-chlorophenol, m-methoxyphenol, m-cresol, m-phenylenediamine, and phenol.
5. The hydrogen peroxide production method according to Item 1, wherein the organic polymer photocatalyst comprises a resorcinol-formaldehyde resin.
6. The hydrogen peroxide production method according to any one of Items 1 to 5, wherein the reaction system in the hydrogen peroxide generation step has a pH of 2 to 10.
7. A hydrogen peroxide production kit comprising an organic polymer photocatalyst, wherein
(1) the organic polymer photocatalyst comprises an organic polymer having a structure such that a monocyclic or polycyclic aromatic compound and/or a monocyclic or polycyclic heteroaromatic compound is/are linked by a bridging group, and
(2) the organic polymer has a band structure such that a conduction band (CB) has a potential lower than the potential of two-electron reduction of $O_2$, and a valance band (VB) has a potential higher than the potential of four-electron oxidation of water.
8. The hydrogen peroxide production kit according to Item 7, wherein the organic polymer photocatalyst comprises a resorcinol-formaldehyde resin.
9. An organic polymer photocatalyst for use in a hydrogen peroxide production method, wherein
(1) the organic polymer photocatalyst comprises an organic polymer having a structure such that a monocyclic or polycyclic aromatic compound and/or a monocyclic or polycyclic heteroaromatic compound is/are linked by a bridging group, and
(2) the organic polymer has a band structure such that a conduction band (CB) has a potential lower than the potential of two-electron reduction of $O_2$, and a valance band (VB) has a potential higher than the potential of four-electron oxidation of water.
10. The organic polymer photocatalyst according to Item 9, wherein the organic polymer photocatalyst comprises a resorcinol-formaldehyde resin.
11. An organic polymer photocatalyst production method comprising the step of subjecting a starting material mixture containing resorcinol and formaldehyde to hydrothermal reaction in an aqueous-based solvent in the presence of an acid catalyst or base catalyst to thereby obtain a resorcinol-formaldehyde resin.

Advantageous Effects of Invention

According to the hydrogen peroxide production method of the present invention, pure hydrogen peroxide can be obtained by using as a photocatalyst an organic polymer that has a specific band structure and a structure such that a monocyclic or polycyclic aromatic compound and/or a monocyclic or polycyclic heteroaromatic compound is/are linked by a bridging group. In the method, water is used as a starting material, and four-electron oxidization of water and two-electron reduction of $O_2$ are used. The present invention not only attains higher safety and higher production efficiency than conventional methods but also has a cost advantage because hydrogen peroxide can be obtained without using a noble metal catalyst or metal oxide catalyst.

BRIEF DESCRIPTION OF DRAWINGS

FIG. 1 shows a structure of a resorcinol-formaldehyde resin ("RF resin") used as an organic polymer photocatalyst in the present invention. FIG. 1 includes methylene and methylene ether linkages as bridging groups.

DESCRIPTION OF EMBODIMENTS

The present invention is explained in detail below.
1. Hydrogen Peroxide Production Method The hydrogen peroxide production method of the present invention includes (1) a hydrogen peroxide generation step of generating hydrogen peroxide by irradiating a reaction system containing water, an organic polymer photocatalyst, and $O_2$ with light, wherein (2) the organic polymer photocatalyst comprises an organic polymer having a structure such that a monocyclic or polycyclic aromatic compound and/or a monocyclic or polycyclic heteroaromatic compound is/are linked by a bridging group, and (3) the organic polymer has a band structure such that the conduction band (CB) has a potential lower than that of two-electron reduction of $O_2$, and the valance band (VB) has a potential higher than that of four-electron oxidation of water.

According to the hydrogen peroxide production method of the present invention having the above features, pure hydrogen peroxide can be obtained by using as a photocatalyst, an organic polymer that has a specific band structure and a structure such that a monocyclic or polycyclic aromatic compound and/or monocyclic or polycyclic heteroaromatic compound is/are linked by a bridging group. In the method, water is used as a starting material, and four-electron oxidization of water and two-electron reduction of $O_2$ are used. The present invention not only attains higher safety and higher production efficiency than conventional methods but also has a cost advantage because hydrogen peroxide can be obtained without using a noble metal catalyst or metal oxide catalyst.

Organic Polymer Photocatalyst and Method for Producing the Photocatalyst

The hydrogen peroxide production method of the present invention uses a specific organic polymer photocatalyst. The organic polymer photocatalyst comprises an organic polymer (organic polymer A) that has a structure such that a monocyclic or polycyclic aromatic compound and/or a monocyclic or polycyclic heteroaromatic compound is/are linked by a bridging group, and a band structure such that the potential of the conduction band (CB) is lower than that of two-electron reduction of $O_2$, and the potential of the valance band (VB) is higher than that of four-electron oxidation of water.

There is no limitation on monocyclic or polycyclic aromatic compounds. For example, at least one member selected from the group consisting of benzene, naphthalene, anthracene, phenanthrene, and their derivatives (those having an arbitrary substituent) can be used. Although the derivatives are not limited, those having at least one functional group selected from the group consisting of hydroxy, chlorine, fluorine, aldehyde, and amino in a molecule can be used.

Of these aromatic compounds, from the viewpoint of electron-donating properties, at least one phenol or phenol derivative selected from the group consisting of resorcinol, m-aminophenol, m-chlorophenol, m-methoxyphenol, m-cresol, m-phenylenediamine, and phenol is preferred.

There is no limitation on monocyclic or polycyclic heteroaromatic compounds. For example, at least one member selected from the group consisting of pyridine, thiophene, quinoline, phenanthroline, and their derivatives (those having an arbitrary substituent) can be used. Although the derivatives are not limited, those having at least one functional group selected from the group consisting of hydroxy, chlorine, fluorine, aldehyde, and amino in a molecule can be used.

The bridging group (linker) for linking these aromatic compounds and/or heteroaromatic compounds to form an organic polymer is not limited; however, a short bridging group is preferred from the viewpoint of electronic conductivity. For example, at least one member selected from the group consisting of methylene ($-CH_2-$), ethylene ($-CH_2-CH_2-$), and methylene ether ($-CH_2-O-CH_2-$) linkages can be used.

The organic polymer having a structure such that the aromatic compound and/or the heteroaromatic compound is/are linked by a bridging group is preferably in the form of spherical microparticles. The average particle size of the spherical microparticles is preferably 0.01 to 100 μm, and more preferably 0.1 to 1 μm. The specific surface area (Brunauer-Emmett-Teller (BET) specific surface area) of the organic polymer is preferably 1 to 100 $m^2/g$, and more preferably 10 to 100 $m^2/g$. When the average particle size and the specific surface area are within the above range, high solar-to-chemical conversion efficiency is attained, and excellent photocatalyst efficiency is likely to be obtained.

The average particle size of the organic polymer in this specification is the value measured by SEM observation using a Hitachi S-2250 microscope. The specific surface area (BET specific surface area) of the organic polymer is the value measured by nitrogen adsorption-desorption measurement (77K) using a BELSORP 18 PLUS-SP analyzer (BEL Japan, Inc.).

Figure 1:
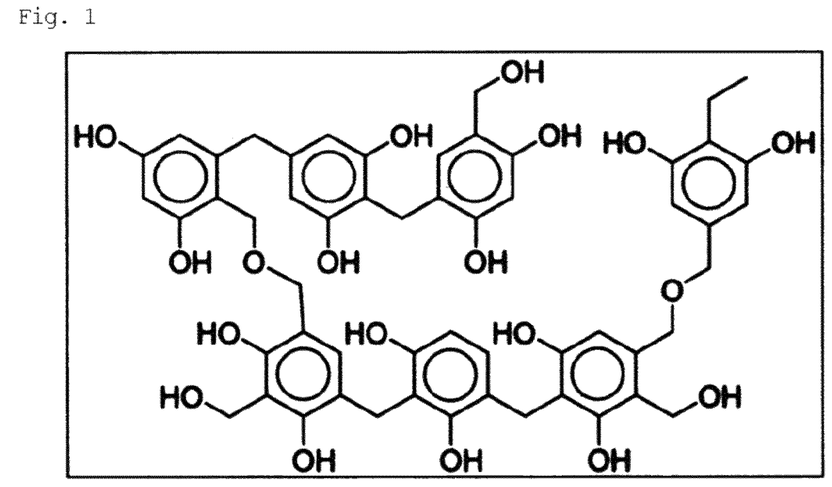

In the present invention, preferred among the organic polymers is a resorcinol-formaldehyde resin (RF resin) in which resorcinol, a monocyclic aromatic compound, is linked by at least one bridging group selected from methylene, ethylene, or methylene ether linkages. FIG. 1 shows a structure of a resorcinol-formaldehyde resin, in which resorcinol is bridged by methylene and methylene ether linkages to form an organic polymer.

The organic polymer used in the present invention is used as a photocatalyst in the hydrogen peroxide production process. The band structure of the organic polymer is such that the potential of the conduction band (CB) is lower than that of two-electron reduction of $O_2$, and the potential of the valence band (VB) is higher than that of four-electron oxidation potential of water.

As shown in Examples below, it is proved that the resorcinol-formaldehyde resin shown in FIG. 1 and resins in which resorcinol in the resorcinol-formaldehyde resin is substituted with at least one phenol or electron-donating functional group-containing phenol derivative selected from the group consisting of m-aminophenol, m-chlorophenol, m-methoxyphenol, m-cresol, m-phenylenediamine, and phenol can function as photocatalysts in the hydrogen peroxide production process. In the band structure of such resins, the potential of the conduction band (CB) is lower than that of two-electron reduction of $O_2$, and the potential of the valence band (VB) is higher than that of four-electron oxidation of water. In particular, a resin obtained by substituting resorcinol in the resorcinol-formaldehyde resin with an electron-donating functional group-containing phenol derivative can easily attain a band structure that is suitable for photocatalyst.

Since the potential of two-electron reduction ($O_2/H_2O_2$) of $O_2$ in the band structure measured according to V vs Ag/AgCl (pH 6.6) is 0.08 V, the potential of the conduction band (CB) may be lower than 0.08 V, and preferably about $-1$ to 0 V. Further, since the potential of four-electron oxidation ($H_2O/O_2$) of water is 0.63 V, the potential of the valence band (VB) is higher than 0.63 V, and preferably about 0.7 to 2.5 V.

The organic polymer photocatalyst can be formed so as not to contain a metal atom in its molecule. As compared to conventional hydrogen peroxide production methods, the method of the present invention has a significant cost advantage because hydrogen peroxide can be obtained without using a noble metal catalyst or a metal oxide catalyst.

It is preferable that the organic polymer photocatalyst further contains a thiophene-based conductive organic polymer (organic polymer B) in addition to the organic polymer (organic polymer A) having a structure such that the aromatic compound and/or heteroaromatic compound is/are linked by a bridging group. In the case of containing the organic polymer B, the organic polymer A and the organic polymer B are present as a mixture. If the organic polymer photocatalyst is in the form of spherical microparticles as mentioned above, spherical microparticles containing the organic polymer A and the organic polymer B are preferred. Even when the organic polymer B is contained, preferable ranges of the average particle size, specific surface area, etc. of the spherical microparticles are the same as above.

The thiophene-based conductive organic polymer (organic high polymer B) is not limited as long as it is a polymer having a polythiophene structure. Examples include PEDOT "(poly (3,4-ethylene dioxythiophene)", n-poly(3-butyl thiophene), n-poly (3,4-dibutylthiophene), and the like. Particularly preferred among these is PEDOT. By containing the organic polymer B together with the organic polymer A, the solar-to-chemical conversion efficiency of the organic polymer photocatalyst is increased, thereby enhancing photocatalyst effects.

The organic polymer photocatalyst production method is not particularly limited as long as the method can obtain an organic polymer having the specific structure and the specific band structure explained above. One preferred method of the present invention includes the step of subjecting a starting material mixture containing formaldehyde and a monocyclic or polycyclic aromatic compound and/or a monocyclic or polycyclic heteroaromatic compound (starting material aromatic compound) in which at least one carbon atom constituting the aromatic ring is not substituted, to hydrothermal reaction in an aqueous-based solvent in the presence of an acid catalyst or a base catalyst. In order to obtain an organic polymer photocatalyst that further contains the organic polymer B, powder of a thiophene-based conductive organic polymer that is the organic polymer B is mixed with the starting material component that is to be subjected to the hydrothermal reaction.

The aromatic compound and the heteroaromatic compound are as explained above.

Although the mixing ratio (molar ratio) of the starting material aromatic compound and formaldehyde contained in the starting material mixture is not limited, the mixing ratio represented by X/Y=starting material aromatic compound/formaldehyde (mol/mol) is preferably 1/1 to 2.5, and more preferably 1/1.5 to 2.5.

The aqueous-based solvent used in the hydrothermal reaction is not limited, and water, a mixed solvent of water and alcohol, etc. can be used. However, since a reduced mixing proportion of alcohol in a solvent increases the surface tension of the aqueous-based solvent and is likely to reduce the average particle size of the resulting organic polymer photocatalyst (improve catalytic activity), the proportion of alcohol mixed in the aqueous-based solvent is preferably low. Use of water alone as a solvent is more preferred.

Acid catalysts or base catalysts used for hydrothermal reaction are not limited. Oxalic acid etc. can be preferably used as an acid catalyst, and ammonia can be used as a base catalyst. Sodium carbonate is generally known as a base catalyst; however, to reduce the average particle size of the resulting organic polymer photocatalyst (improve catalytic activity), ammonia is more preferably used as a base catalyst than sodium carbonate.

The amount of the acid catalyst or base catalyst in the hydrothermal reaction system is not limited. The amount of the acid catalyst is preferably 0.001 to 0.5 mol, and more preferably 0.001 to 0.05 mol, per mol of the starting material aromatic compound. The amount of the base catalyst is preferably 0.1 to 5 mol, and more preferably 0.1 to 0.8 mol, per mol of the starting material aromatic compound.

The treatment temperature in the hydrothermal reaction is not limited. In general, the temperature can be suitably selected from the range between 100 to 250° C. In the present invention, since a relatively high treatment temperature allows the organic polymer photocatalyst to easily form a stable charge transfer absorption band, thereby improving catalytic activity, hydrothermal reaction preferably proceeds at a relatively high temperature range, i.e., 200 to 250° C. Hydrothermal reaction can be performed using a known autoclave.

In the present invention, use of resorcinol as a starting material aromatic compound is preferred, and a preferred organic polymer photocatalyst production method is a method that includes the step of subjecting a starting material mixture containing resorcinol and formaldehyde to hydrothermal reaction in an aqueous-based solvent in the presence of an acid catalyst or base catalyst to obtain a resorcinol-formaldehyde resin. To obtain an organic polymer photocatalyst that additionally contains an organic polymer B (especially PEDOT), it is preferable to add PEDOT in an amount of 1 to 20 mg, and more preferably about 2 to 6 mg, per 400 mg of resorcinol in the starting material components to be subjected to hydrothermal reaction. Addition of PEDOT in the above proportion will easily enhance the photocatalyst effects of the organic polymer photocatalyst.

As in the case of the use of resorcinol as a starting material aromatic compound, an organic polymer photocatalyst that is suitable for carrying out the hydrogen peroxide production method of the present invention can be suitably produced by a production method in which resorcinol is changed to at least one phenol or phenol derivative (preferably phenol derivative) selected from the group consisting of m-aminophenol, m-chlorophenol, m-methoxyphenol, m-cresol, m-phenylenediamine, and phenol.

Hydrogen Peroxide Generation Step

In the hydrogen peroxide generation step in the hydrogen peroxide production method of the present invention, hydrogen peroxide is generated by irradiating the reaction system containing water, an organic polymer photocatalyst, and $O_2$ with light.

To perform the hydrogen peroxide generation step, the reaction system containing water, an organic polymer photocatalyst, and $O_2$ is first prepared. For example, the organic polymer photocatalyst and $O_2$ may be separately dispersed in water. When a substance is not easily dispersed in water, ultrasonic irradiation etc. may be performed according to a known method to increase dispersibility.

The concentration of the organic polymer photocatalyst in the reaction system is not particularly limited, and it is preferably 0.1 to 10 mg/mL, and more preferably 1 to 10 mg/mL. The concentration of $O_2$ is not particularly limited; however, from the viewpoint of reactivity, as high concentration as possible is preferred, and saturating the reaction system (water) with $O_2$ is particularly preferred. In the hydrogen peroxide production method of the present invention, $O_2$ can be obtained by four-electron oxidization of water; however, hydrogen peroxide cannot be efficiently obtained by merely performing two-electron reduction of $O_2$ that is obtained by the four-electron oxidization of water.

Accordingly, $O_2$ must be included in the reaction system (water) beforehand as stated above.

The reaction system may further contain a substance other than water, the organic polymer photocatalyst, and $O_2$. For example, the reaction system may further contain a pH adjuster from the viewpoint of reactivity described below. Examples of pH adjusters include base substances, such as sodium hydroxide, potassium hydroxide, sodium hydrogenphosphate, potassium hydrogenphosphate, sodium phosphate, potassium phosphate, and sodium acetate; and acid substances, such as hydrochloric acid, sulfuric acid, nitric acid, acetic acid, and phosphoric acid.

Additionally, a pH buffer solution obtained by dissolving a pH buffer in water may be also used. Examples of pH buffer solutions include phosphoric-acid buffer solutions, acetic-acid buffer solutions, etc. The amounts of the pH adjuster and the pH buffer to be added are not particularly limited, and can be suitably determined.

Although it depends on other reaction conditions, the reaction efficiency of $O_2$ reduction is often high under acid conditions, and the reaction efficiency of water oxidation is high under basic conditions. Considering the above, it is preferable to suitably determine the pH of the reaction system so as to improve the production efficiency of hydrogen peroxide. From this point of view, the pH of the reaction system is generally 2 to 10, preferably 2 to 8, more preferably 2 to 7, and most preferably 2 to 6.

The reaction system may further contain an organic solvent. Examples of organic solvents include nitriles such as benzonitrile, acetonitrile, and butyronitrile; halogenated solvents such as chloroform and dichloromethane; ethers such as THF (tetrahydrofuran); amides such as DMF (dimethylformamide); sulfoxides such as DMSO (dimethyl sulfoxide); ketones such as acetone; and alcohols such as methanol. These organic solvents can be used singly or in a combination of two or more. From the viewpoint of solubility of the transition metal complex and stability of the excited state, a highly polar solvent is preferred as an organic solvent, and acetonitrile is particularly preferred.

Next, hydrogen peroxide is generated by irradiating the reaction system with light. Irradiation light for use in light irradiation is not particularly limited, and is preferably visible light. In order to excite the organic polymer catalyst by visible light, the organic polymer catalyst preferably has an absorption band in a visible light range. Although it depends on the absorption band of the organic polymer photocatalyst, the wavelength of visible light to be irradiated is preferably 400 to 800 nm, more preferably 400 to 650 nm, and most preferably 400 to 550 nm. In the hydrogen peroxide generation step, the temperature of the reaction system during light irradiation is preferably 10 to 60° C., more preferably 30 to 60° C., and most preferably 50 to 60° C.

The light source used in the light irradiation is not particularly limited. To save energy, natural light such as sunlight is preferably used. Since sunlight includes light in a wide wavelength region (particularly visible light region) and has excellent light intensity, high reaction efficiency can be easily obtained. As a substitute for or in addition to natural light, light sources such as a xenon lamp, a halogen lamp, a fluorescent lamp, and a mercury lamp can be suitably used. If necessary, a filter cutting wavelengths other than the required wavelengths can be also used.

During the light irradiation, the reaction system may be allowed to stand or be stirred. The reaction system may be heated as needed; however, reaction by light irradiation alone without heating is simple and preferred. The time for light irradiation, light intensity, etc. are not particularly limited, and can be suitably determined. Although it depends on the light source, when irradiation light contains infrared rays, the temperature of the reaction system can be increased to about 60° C. by simple light irradiation without separately heating.

The reaction mechanism in the hydrogen peroxide generation step is generation of hydrogen peroxide using four-electron oxidization of water and two-electron reduction of $O_2$. $O_2$ that is to be a starting material of hydrogen peroxide may be $O_2$ that is obtained by four-electron oxidization of water, $O_2$ that has been contained in the reaction system before reaction, or $O_2$ that is incorporated into the reaction system from the atmosphere while the reaction system is stirred. As mentioned above, it is particularly preferable to saturate the reaction system (in water) with $O_2$ beforehand from the viewpoint of reaction efficiency.

The hydrogen peroxide production method according to the present invention can be thus performed. If necessary, the hydrogen peroxide production method of the present invention may further include, after the step of hydrogen peroxide generation step, a hydrogen peroxide purification step of purifying the generated hydrogen peroxide. This step allows the obtainment of highly pure hydrogen peroxide or a highly pure hydrogen peroxide solution suitable for practical use. Although the specific methods are not limited, hydrogen peroxide is, for example, extracted using ion exchange water etc., and distillation under reduced pressure is performed, thus obtaining a highly concentrated hydrogen peroxide solution.

2. Hydrogen Peroxide Production Kit

The hydrogen peroxide production kit of the present invention includes an organic polymer photocatalyst, wherein (1) the organic polymer photocatalyst comprises an organic polymer having a structure such that a monocyclic or polycyclic aromatic compound and/or a monocyclic or polycyclic heteroaromatic compound is/are linked by a bridging group, and (2) the organic polymer has a band structure such that the conduction band (CB) has a potential lower than that of two-electron reduction of $O_2$, and the valance band (VB) has a potential higher than that of four-electron oxidation of water. Explanations of each of the features are as given above.

Specifically, the hydrogen peroxide production kit of the present invention is any kit that includes at least a predetermined organic polymer photocatalyst, and optionally contains a combination of other materials and members, as long as the kit can perform the hydrogen peroxide production method of the present invention. Examples of other materials and members include additives (the pH adjusters and pH buffers mentioned above) that can be optionally added to water, a light source, and a reaction system.

The hydrogen peroxide production kit of the present invention can be used for various applications such as laboratory use and industrial use by changing its structure, scale, etc.

EXAMPLES

The present invention is explained in detail below with reference to Examples (Preparation Examples). However, the present invention is not limited to the Examples (Preparation Examples).

Preparation Example 1 (Synthesis of RF Resins Using Various Kinds of Base Catalysts)

400 mg of resorcinol, 612 mg of formaldehyde (R/F molar ratio (R/F ratio) of about 1/2), and 1.7 mmol of a base catalyst shown in Table 1 were added to a mixing solution containing 40 mL of water and 32 mL of ethanol.

In Entry 1, $Na_2CO_3$ (powder: 0.5 mg) was used as a base catalyst.

In Entry 2, $NH_3$ (0.18 mL of 28% aqueous solution) was used as a base catalyst.

The solution was placed in a Teflon (registered trademark) container (capacity: 60 cc), and the container was set in a stainless steel autoclave. Subsequently, the autoclave was placed in an oven heated at 200° C., and allowed to stand (hydrothermal treatment) for 24 hours. The autoclave was then allowed to stand at room temperature for 30 minutes and cooled.

TABLE 1

| entry | catalyst | BET surface area/m² g⁻¹ | $H_2O_2$/μmol |
|---|---|---|---|
| 1 | RF1/2 ($Na_2CO_3$) | 1.5 | 7.1 |
| 2 | RF1/2 ($NH_3$) | 10.8 | 43.0 |

In Entry 1, the solution became a red massive solid (gel) when taken out from the autoclave. After the solid was pulverized in a mortar, the resulting powder was placed in a glass Soxhlet extractor. Acetone was set as a washing liquid, and washing was conducted for 24 hours under heating at 70° C. The resulting powder was placed in a vacuum desiccator and dried at room temperature. Thus, the RF resin (photocatalyst) of Entry 1 was obtained.

In Entry 2, the solution became an orange suspension when taken out from the autoclave. The suspension was placed in a glass Soxhlet extractor. Acetone was set as a washing liquid, and washing was conducted for 24 hours under heating at 70° C. The resulting powder was placed in a vacuum desiccator and dried at room temperature. Thus, the RF resin (photocatalyst) of Entry 2 was obtained.

The BET specific surface area of each RF resin obtained in Entry 1 or 2 was determined by nitrogen adsorption-desorption measurement (77K) using a BELSORP 18 PLUS-SP analyzer (BEL Japan, Inc.). The same applies to other preparation examples. The results are shown in Table 1.

RF resins obtained in Entry 1 and 2 were observed with an SEM, specifically, a Hitachi S-2250-microscope. From the results of SEM observation, the particle size of each RF resin can be obtained. The same applies to other preparation examples.

Figure 2:
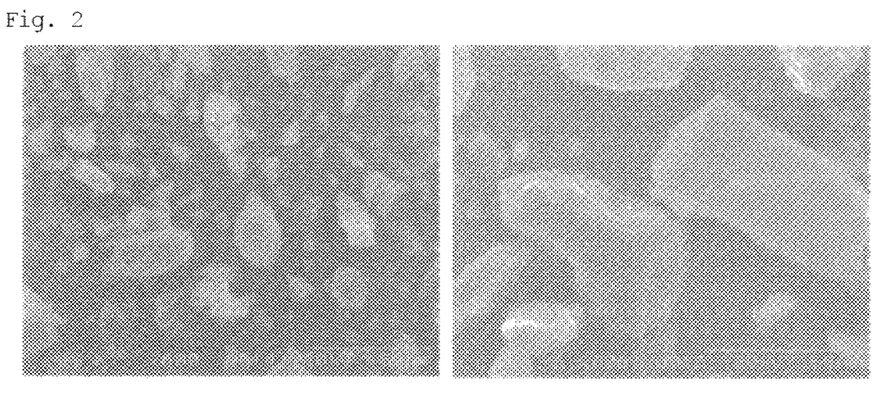
FIG. 2 shows scanning electron microscopy (SEM) observation images of the RF resin obtained in Entry 1 of Preparation Example 1. The lens magnification in the left figure is 600-fold while the lens magnification in the right figure is 800-fold.
Figure 3:
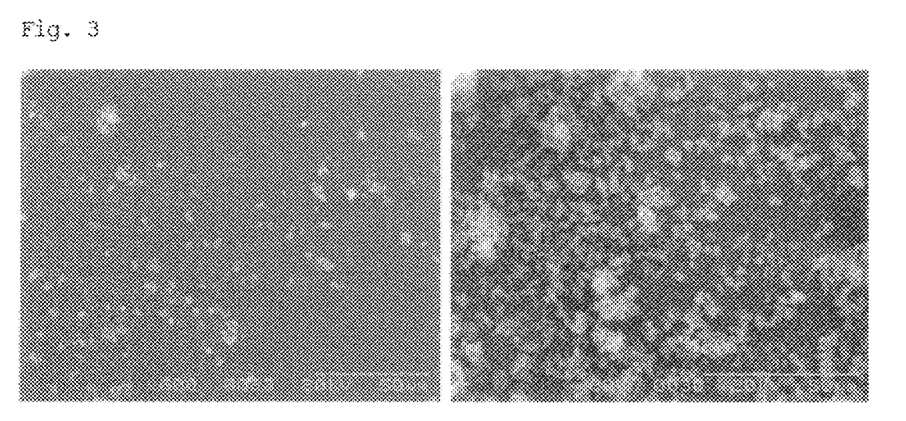
FIG. 3 shows SEM observation images of the RF resin obtained in Entry 2 of Preparation Example 1. The lens magnification in the left figure is 600-fold while the lens magnification in the right figure is 800-fold.

The SEM observation image of the RF resin obtained in Entry 1 is shown in FIG. 2. The lens magnification in the left figure in FIG. 2 is 600-fold while the lens magnification in the right figure is 800-fold. FIG. 2 indicates that particles having a particle size of 10 to 50 μm were obtained. The SEM observation image of the RF resin obtained in Entry 2 is shown in FIG. 3. The lens magnification in the left figure in FIG. 3 is 600-fold while the lens magnification in the right figure is 800-fold. FIG. 3 indicates that microparticles having a particle size of less than 1 μm were obtained.

Evaluation of Photocatalyst Activity of RF Resin

Pure water (30 ml), 50 mg of each photocatalyst, and a magnetic stirrer bar were placed in a borosilicate glass container (capacity: 50 cc, inside diameter: 3.5 cm). The top of the container was capped with a rubber septum. Ultrasonic treatment was performed in the reaction container for 5 minutes to disperse the photocatalyst in the solution. By inserting a syringe, the inside of the container was purged with $O_2$ gas for 15 minutes.

The reaction container was placed in a Pyrex (registered trademark) water bath (298±0.5 K) set on the magnetic stirrer, and light was irradiated from the side for 24 hours using a xenon lamp (2 kW, produced by Ushio Inc.) while stirring the container. During irradiation, light with a wavelength of 420 nm or more was irradiated using a color glass filter L42 (produced by Asahi techno glass). The intensity of light in the range of 420 to 500 nm was 520.6 $Wm^{-2}$.

After completing the reaction, the rubber septa was removed, and the suspension was centrifuged to thereby collect the solution and the photocatalyst.

The amount of $H_2O_2$ in the solution was analyzed by HPLC (Prominence UFLC, Shimadzu) using an electrochemistry analyzer (ED723, GL Sciences Inc.) as a detector. The photocatalyst activity was evaluated based on the production amount of $H_2O_2$. The same applies to other preparation examples. The results are shown in Table 1.

The results of Table 1 indicate the following. According to a comparison between base catalysts of $Na_2CO_3$ and $NH_3$, the use of $NH_3$ easily achieves an RF resin having a small particle size (large specific surface area), and a large production amount of $H_2O_2$, i.e., high catalyst activity. This is presumably because the use of $NH_3$ protects the particle surface of the produced RF resin to prevent particle growth, thus yielding microparticles.

Preparation Example 2 (Synthesis of RF Resins Using a Different Amount of Base Catalyst $NH_3$)

By changing the amount of base catalyst $NH_3$, each RF resin (photocatalyst) was obtained.

Entry 2 in Preparation Example 2 was the same as Entry 2 of Preparation Example 1. Specifically, in Entry 1 of Preparation Example 2, 0.09 mL of a 28% aqueous solution was used as $NH_3$. In Entry 3 of Preparation Example 2, 0.36 mL of a 28% aqueous solution was used as $NH_3$. The other conditions were the same as for Entry 2 of Preparation Example 1.

TABLE 2

| entry | catalyst | $NH_3$ aq./mL | particle size/nm | $H_2O_2$/μmol |
|---|---|---|---|---|
| 1 | RF1/2 ($NH_3$) | 0.09 | 1242 ± 106 | 24.3 |
| 2 | 200° C., 24 h | 0.18 | 941.6 ± 52.5 | 43.0 |
| 3 | | 0.36 | 750.0 ± 67.1 | 30.2 |

The particle size of each RF resin was determined by the SEM observation explained in Preparation Example 1, and is shown in Table 2. The photocatalyst activity of each RF resin was evaluated as in Preparation Example 1, and the production amount of $H_2O_2$ is shown in Table 2.

The results of Table 2 indicates that the use of $NH_3$ in an amount of Entry 2 achieves the highest photocatalyst activity. This is presumably because although a smaller amount of $NH_3$ tends to increase the particle size and a larger amount of $NH_3$ tends to generate microparticles, an increase in the number of bridging groups in the RF resin produces hydrophobic RF resin, which is difficult to disperse in water.

Preparation Example 3 (Synthesis of RF Resins Having a Different Water/Ethanol Ratio by Use of Base Catalyst $NH_3$)

Each RF resin (photocatalyst) was obtained by using base catalyst $NH_3$ and changing the water/ethanol ratio (volume ratio).

Entry 3 of Preparation Example 3 was the same as Entry 2 of Preparation Example 1, and the water/ethanol ratio was 40/32. Specifically, in Entry 1 and 2 of Preparation Example 3, the water/ethanol ratio was changed to 40/0 and 40/16, respectively. The other conditions were the same as for Entry 2 of Preparation Example 1.

TABLE 3

| entry | catalyst | water/EtOH (mL/mL) | particle size/nm | $H_2O_2$/µmol |
|---|---|---|---|---|
| 1 | RF1/2 ($NH_3$) | 40/0 | 622.6 ± 50.0 | 48.3 |
| 2 | 200° C., 24 h | 40/16 | 941.6 ± 52.5 | 43.0 |
| 3 | $NH_3$: 0.18 mL | 40/32 | 1031 ± 54.0 | 34.8 |

The results of Table 3 indicate that as the amount of ethanol in the water/ethanol mixing solution decreases, the surface tension of RF resin increases, which reduces the particle size. The results of Table 3 also indicates that as the particle size decreases (specific surface area increases), the photocatalyst activity increases.

Preparation Example 4 (Synthesis of RF Resins Having a Different R/F Ratio by Use of Base Catalyst $NH_3$)

Each RF resin (photocatalyst) was obtained by using base catalyst $NH_3$ and changing the R/F ratio.

Entry 3 of Preparation Example 4 was based on Entry 2 of Preparation Example 1 (R/F ratio=1/2), in which water was used (ethanol was not used) in place of the water/ethanol mixing solution. In Entry 1, 2, 4, and 5 of Preparation Example 4, the R/F ratio was also changed.

Specifically, in Entry 1, 2, 4, and 5 of Preparation Example 4, the R/F ratio was respectively changed to 1/1, 1/1.5, 1/2.5, and 1/3. The other conditions were the same as for Entry 2 of Preparation Example 1.

TABLE 4

| entry | catalyst | resorcinol/ formaldehyde (mol/mol) | particle size/nm | $H_2O_2$/µmol |
|---|---|---|---|---|
| 1 | RFx/y ($NH_3$) | 1/1 | 435.6 ± 62.4 | 40.6 |
| 2 | 200° C., 24 h | 1/1.5 | 524.1 ± 47.4 | 46.1 |
| 3 | $NH_3$: 0.18 mL | 1/2 | 622.6 ± 50.0 | 48.3 |
| 4 | water/EtOH, 40/0 | 1/2.5 | 702.4 ± 75.1 | 43.6 |
| 5 | | 1/3 | 760.1 ± 77.9 | 36.8 |

The results of Table 4 indicates the following. As the R/F ratio increases (as the number of bridging groups derived from formaldehyde decreases), the particle size of the RF resin decreases; however, a small number of bridging groups rather reduces photocatalyst activity. This is presumably because a small number of bridging groups makes it difficult to form a stable resin.

Preparation Example 5 (Synthesis of RF Resins by Use of Base Catalyst $NH_3$ at a Different Hydrothermal Treatment Temperature)

Each RF resin (photocatalyst) was obtained by using base catalyst $NH_3$ and changing the hydrothermal treatment temperature.

Entry 3 of Preparation Example 5 was based on Entry 2 of Preparation Example 1 (hydrothermal treatment temperature=200° C.), in which water was used (ethanol was not used) in place of the water/ethanol mixing solution. In Entry 1, 2, and 4 of Preparation Example 5, the hydrothermal treatment temperature was also changed.

Specifically, in Entry 1, 2, and 4 of Preparation Example 5, the hydrothermal treatment temperature was respectively changed to 100, 150, and 250° C. The other conditions were the same as for Entry 2 of Preparation Example 1.

TABLE 5

| entry | catalyst | temperature/° C. | particle size/nm | $H_2O_2$/µmol |
|---|---|---|---|---|
| 1 | RF1/2 | 100 | | 18.4 |
| 2 | ($NH_3$) | 150 | | 26.6 |
| 3 | | 200 | 622.6 ± 50.0 | 48.3 |
| 4 | | 250 | 693.5 ± 102 | 61.6 |

Figure 4:
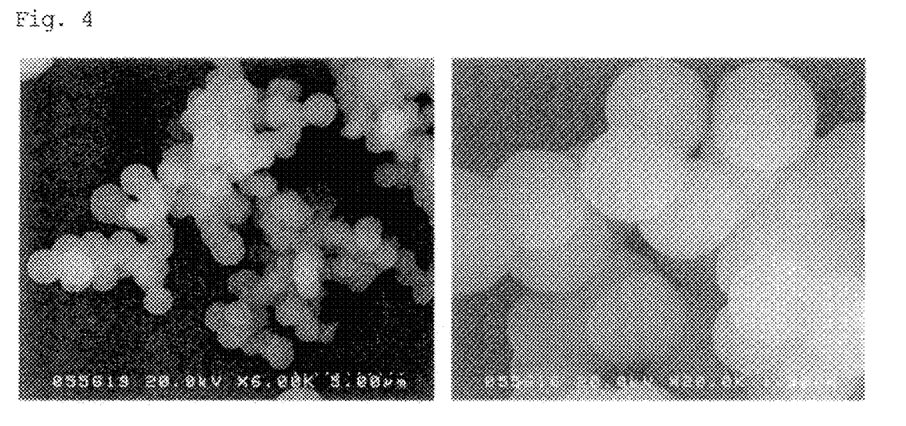
FIG. 4 shows SEM observation images of the RF resin obtained in Entry 4 of Preparation Example 5. The lens magnification in the figure on the left is 6000-fold while the lens magnification in the figure on the right is 20000-fold.
Figure 5:
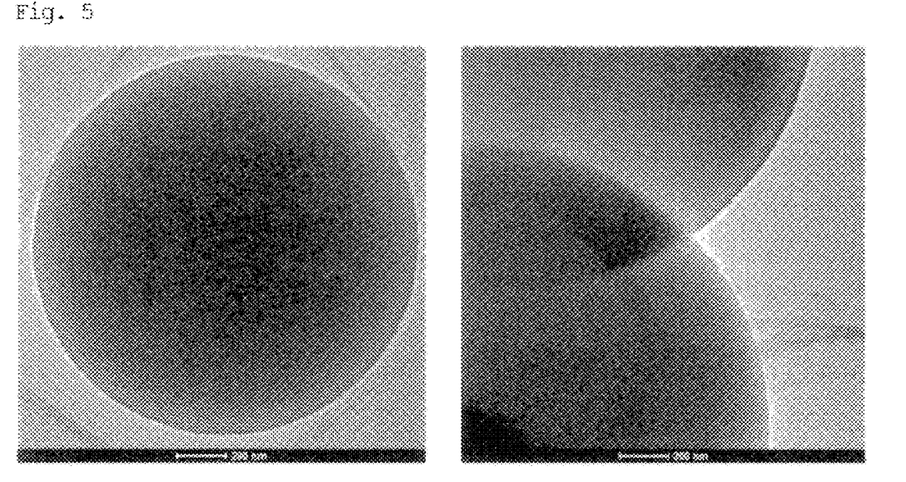
FIG. 5 shows transmission electron microscopy (TEM) observation images of the RF resin obtained in Entry 4 of Preparation Example 5. The lens magnifications in both left and light figures are 60000-fold.

The SEM observation images of the RF resin obtained in Entry 4 of Preparation Example 5 are shown in FIG. 4. The lens magnification in the left figure in FIG. 4 is 6000-fold while the lens magnification in the right figure is 20000-fold. The TEM observation images of the RF resin obtained in Entry 4 of Preparation Example 5 are shown in FIG. 5. The lens magnification in the figures on the left and right of FIG. 5 is both 60000-fold. The TEM observations were performed using a FEI Tecnai G2 20ST electron microscope (200 kV).

The results of Table 5 indicate that as the hydrothermal treatment temperature increases, the photocatalyst activity of the obtained RF resin increases. This is presumably because as the hydrothermal treatment temperature increases, a stable charge transfer absorption band is easily formed in the RF resin.

Evaluation of Solar-to-Chemical Conversion Efficiency of RF Resin Obtained in Entry 4 of Preparation Example 5

The solar-to-chemical conversion efficiency (SCC efficiency (%)) of RF resin was calculated using a solar simulator (SX-UID502XQ) produced by USHIO Inc.

Specifically, pure water (50 mL) and an RF resin (250 mg) were placed in a borosilicate glass container (reaction container) (100 cc, inner diameter: 3.5 cm), and $O_2$ gas (1 atm) was introduced to perform light irradiation. During light irradiation, light having a wavelength of X>420 nm or more was irradiated using a colored glass filter produced by Asahi Techno Glass Co., Ltd.

The light intensity of the solar simulator corresponds to the conditions according to AM 1.5 global spectrum (American society for testing and materials (ASTM) terrestrial reference spectra for photovoltaic performance evaluation, National renewable energy laboratory (NREL)).

The reaction container was placed in a water bath, and light irradiation was performed for 2 hours while the temperature of the reaction solution was kept constant (three embodiments of 25° C., 40° C., and 60° C.)

The solar-to-chemical conversion efficiency (SCC efficiency) was calculated using the following formula.

$$SCC \text{ efficiency } (\%) = \frac{[\Delta G \text{ for } H_2O_2 \text{ generation (J mol}^{-1})] \times [H_2O_2 \text{ formed (mol)}]}{[\text{total input energy (W)}] \times [\text{reaction time (s)}]} \times 100$$

Table 6 shows the calculation results of solar-to-chemical conversion efficiency.

TABLE 6

| Catalyst | Time (h) | Temperature (° C.) | $H_2O_2$ (μmol) | SCC efficiency (%) |
|---|---|---|---|---|
| RF 1/2 | 2 | 25 | 75.2 | 0.39 |
| Catalyst produced at 250° C. | 2 | 40 | 103.6 | 0.54 |
|  | 2 | 60 | 133.0 | 0.69 |

The results of Table 6 indicates that the RF resin obtained in Entry 4 of Preparation Example 5 produces hydrogen peroxide at a solar-to-chemical conversion efficiency of 0.39% or more. As the reaction temperature increases, the conversion efficiency increases. This is because an increase in reaction temperature enhances the conductivity of the RF resin, thus exhibiting high photocatalyst activity. NPL 4 Reijnders, L.; Huijbregts, M. Biofuels for Road Transport: A Seed to Wheel Perspective; Chapter 2. Energy Balance: Cumulative Fossil Fuel Demand and Solar Energy Conversion Efficiency of Transport Biofuels; Springer: New York, 2009; pp 49-74, states that the average of the solar-to-chemical conversion efficiencies of natural photosynthetic plants is about 0.1%. This indicates that the RF resin shows 6 times or more higher solar-to-chemical conversion efficiency.

Preparation Example 6 (Synthesis of Photocatalyst by Use of Phenol or a Phenol Derivative)

In Entry 3 of Preparation Example 5, m-aminophenol, m-chlorophenol, m-methoxyphenol, m-cresol, m-phenylenediamine, and phenol were each used in place of resorcinol.

The photocatalyst activity of each obtained photocatalyst (including the photocatalyst synthesized by use of resorcinol as a reference) was evaluated by the method explained in Preparation Example 1. (Note that the light intensity in a range of 420 to 500 nm was 260.0 $Wm^{-2}$.)

Figure 6:
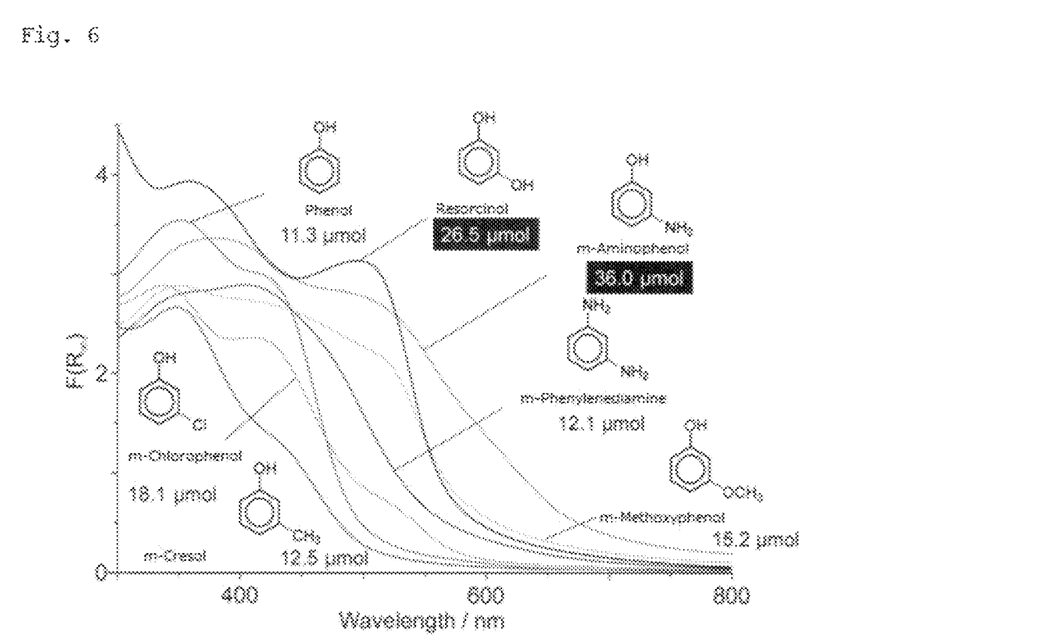
FIG. 6 is a graph showing a photocatalyst activity difference of photocatalysts obtained in Preparation Example 6.

FIG. 6 shows the results of photocatalyst activity (production amount of $H_2O_2$) corresponding to phenol and each phenol derivative. The results of FIG. 6 indicate that photocatalyst activity can be obtained when phenol or any phenol derivative is used. FIG. 6 also indicates that m-aminophenol attains higher photocatalyst activity than resorcinol. This is presumably because m-aminophenol has an electron-donative functional group, as compared to resorcinol, and thus attained a band structure suitable for expressing photocatalyst activity.

Preparation Example 7 (Synthesis of RF Resin by Use of an Oxalic Acid as an Acid Catalyst)

Entry 1 of Preparation Example 7 was the same as Entry 4 of Preparation Example 5.

In Entry 2 to 7 of Preparation Example 7, RF catalysts were synthesized using an acid catalyst (oxalic acid) in the amount shown in Table 7 in place of the base catalyst. The conditions except for the use of acid catalyst were the same as for Entry 4 of Preparation Example 5.

TABLE 7

| entry | Catalyst | Particle Size (nm) | pH | $H_2O_2$ (μmol) |
|---|---|---|---|---|
| 1 | $RF_{1/2}/NH_3$ (1.7 mmol) | — | 8.48 | 61.6 |
| 2 | $RF_{1/2}/(COOH)_2$ 17 mmol | 1047.2 ± 71.4 | 2.12 | 47.8 |
| 3 | $RF_{1/2}/(COOH)_2$ 8.5 mmol | 1097.6 ± 153.0 | 2.74 | 85.3 |
| 4 | $RF_{1/2}/(COOH)_2$ 1.7 mmol | 1019.7 ± 142.2 | 2.99 | 84.7 |
| 5 | $RF_{1/2}/(COOH)_2$ 0.85 mmol | 1165.9 ± 156.6 | 3.52 | 85.9 |
| 6 | $RF_{1/2}/(COOH)_2$ 0.17 mmol | 1043.4 ± 143.4 | 4.18 | 86.7 |
| 7 | $RF_{1/2}/(COOH)_2$ 0.01 mmol | 1135.9 ± 114.8 | 5.56 | 86.1 |

The results of Table 7 indicate that the use of acid catalyst in a suitable amount as shown in Entry 3 to 7 allows the obtained RF resin to have higher photocatalyst activity than those obtained by the use of the base catalyst of Entry 1.

Preparation Example 8 (Synthesis of RF Resin Containing Conductive Polymer PEDOT [Poly(3,4-Ethylenedioxythiophene)]

PEDOT was synthesized according to the description in NPL 5 (Abdiryim and T.; Ali, A.; Jamal, R.; Osman, Y.; Zhang, Y., "A facile solid-state heating method for preparation of poly(3, 4-ethelenedioxythiophene)/ZnO nanocomposite and photocatalytic activity," Nanoscale Research Letters 2014, 9:89.) Specifically, 2,5-dibromo-3,4-ethylene dioxythiophene was placed in a crucible and allowed to stand at 60° C. for 24 hours to obtain black PEDOT powder.

Entry 1 of Preparation Example 8 used the same catalyst as in Entry 6 of Table 7.

In Entry 2 of Preparation Example 8, an RF catalyst was synthesized by adding 4 mg of PEDOT. The conditions except for the addition of PEDOT were the same as for Entry 6 of Preparation Example 7. Specifically, the proportion of resorcinol, formaldehyde, and PEDOT was 400 mg (resorcinol), 612 mg (formaldehyde), and 4 mg (PEDOT).

Using these synthesized catalysts, the solar-to-chemical conversion efficiency was evaluated in the same manner as in Preparation Example 5. The temperature of the reaction solution during light irradiation was kept at 60° C.

The calculation results of solar-to-chemical conversion efficiency are shown in Table 8.

TABLE 8

| entry | catalyst | time/h | $H_2O_2$/ μmol | SCC efficiency/% |
|---|---|---|---|---|
| 1 | RF | 2 | 159.5 | 0.83 |
| 2 | RF/PEDOT | 2 | 226.3 | 1.17 |

The results of Table 8 indicate the following. The RF resin obtained in Entry 6 of Preparation Example 7 (Entry 1 of Preparation Example 8) produces hydrogen peroxide at a solar-to-chemical conversion efficiency of 0.83%. In contrast, the PEDOT-containing RF resin obtained in Entry 2 of Preparation Example 8 produces hydrogen peroxide at a solar-to-chemical conversion efficiency of 1.17%.

NPL 6 (Wang, Q.; Hisatomi, T.; Jia, Q.; Tokudome, H.; Zhong, M.; Wang, C.; Pan, Z.; Takata, T.; Nakabayashi, M.; Shibata, N.; Li, Y.; Sharp and I. D.; Kudo, A.; Yamada, T, Domen, K., "Scalable water splitting on particulate photocatalyst sheets with a solar-to-$H_2$ conversion efficiency exceeding 1%," Nat. Mater. 2016, 15, 611-617) indicates that the maximum solar-to-chemical conversion efficiency in the generation of $H_2$ and $O_2$ by water decomposition using a powdery photocatalyst is 1.1%. This indicates that the PEDOT-containing RF catalyst produces hydrogen peroxide at a higher solar-to-chemical conversion efficiency.

The invention claimed is:

1. A hydrogen peroxide production method comprising:
   (1) a hydrogen peroxide generation step of generating hydrogen peroxide by irradiating a reaction system containing water, an organic polymer photocatalyst, and $O_2$ with light, wherein
   (2) the organic polymer photocatalyst comprises an organic polymer having a structure such that a monocyclic aromatic compound is linked by a bridging group, wherein the monocyclic aromatic compound is at least one phenol or phenol derivative selected from the group consisting of resorcinol, m-aminophenol, m-chlorophenol, m-methoxyphenol, m-cresol, m-phenylenediamine, and phenol, and
   (3) the organic polymer has a band structure such that a conduction band (CB) has a potential lower than the potential of two-electron reduction of $O_2$, and a valance band (VB) has a potential higher than the potential of four-electron oxidation of water.

2. The hydrogen peroxide production method according to claim 1, wherein the bridging group is at least one member selected from the group consisting of methylene, ethylene, and ether linkages.

3. The hydrogen peroxide production method according to claim 1, wherein the organic polymer photocatalyst comprises a resorcinol-formaldehyde resin.

4. The hydrogen peroxide production method according to claim 1, wherein the reaction system in the hydrogen peroxide generation step has a pH of 2 to 10.

5. A hydrogen peroxide production kit comprising an organic polymer photocatalyst effective for generating hydrogen peroxide when the organic polymer photocatalyst is irradiated with light in the presence of water and $O_2$, wherein
   (1) the organic polymer photocatalyst comprises an organic polymer having a structure such that a monocyclic aromatic compound is linked by a bridging group, wherein the monocyclic aromatic compound is at least one phenol or phenol derivative selected from the group consisting of resorcinol, m-aminophenol, m-chlorophenol, m-methoxyphenol, m-cresol, m-phenylenediamine, and phenol,
   (2) the organic polymer has a band structure such that a conduction band (CB) has a potential lower than the potential of two-electron reduction of $O_2$, and a valance band (VB) has a potential higher than the potential of four-electron oxidation of water.

6. The hydrogen peroxide production kit according to claim 5, wherein the organic polymer photocatalyst comprises a resorcinol-formaldehyde resin.

7. An organic polymer photocatalyst for use in a hydrogen peroxide production method, wherein
   (1) the organic polymer photocatalyst comprises an organic polymer having a structure such that a monocyclic aromatic compound is linked by a bridging group, wherein the monocyclic aromatic compound is at least one phenol or phenol derivative selected from the group consisting of resorcinol, m-aminophenol, m-chlorophenol, m-methoxyphenol, m-cresol, m-phenylenediamine, and phenol, and
   (2) the organic polymer has a band structure such that a conduction band (CB) has a potential lower than the potential of two-electron reduction of $O_2$, and a valance band (VB) has a potential higher than the potential of four-electron oxidation of water,
   wherein the organic polymer photocatalyst is effective for generating hydrogen peroxide when the organic polymer photocatalyst is irradiated with light in the presence of water and $O_2$.

* * * * *